(12) United States Patent
Kiowski et al.

(10) Patent No.: US 12,242,508 B1
(45) Date of Patent: Mar. 4, 2025

(54) CLOUD RESOURCE OPERATIONS FOR DATABASES IN MULTIPLE DISTRIBUTED CLOUD DEPLOYMENT ZONES

(71) Applicant: Capital One Services, LLC, McLean, VA (US)

(72) Inventors: Luke Kiowski, Chicago, IL (US); Venkateshwar Parpelli, Frisco, TX (US); Yang Chen, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/581,763

(22) Filed: Feb. 20, 2024

(51) Int. Cl.
*G06F 16/27* (2019.01)

(52) U.S. Cl.
CPC .................................. *G06F 16/27* (2019.01)

(58) Field of Classification Search
None
See application file for complete search history.

(56) References Cited

U.S. PATENT DOCUMENTS

| | | | | |
|---|---|---|---|---|
| 10,499,233 | B2 * | 12/2019 | Shah | G01C 21/3461 |
| 11,425,054 | B1 * | 8/2022 | Dunsmore | H04L 47/828 |
| 2014/0101655 | A1 * | 4/2014 | Brant | G06F 8/61 |
| | | | | 718/1 |
| 2017/0013021 | A1 * | 1/2017 | Hoy | H04L 63/0209 |
| 2019/0238422 | A1 * | 8/2019 | Raney | H04L 41/20 |
| 2022/0358023 | A1 * | 11/2022 | Moser | G06F 11/079 |
| 2023/0195515 | A1 * | 6/2023 | Zhang | G06F 9/5027 |
| | | | | 718/102 |

OTHER PUBLICATIONS

Rayaprolu, Ranjith, et al., "Use Region pinning to set a home Region for items in an Amazon DynamoDB global table," Amazon Web Services, Mar. 20, 2023, https://aws.amazon.com/blogs/database/use-region-pinning-to-set-a-home-region-for-items-in-an-amazon-dynamodb-global-table/.

\* cited by examiner

*Primary Examiner* — Christopher J Raab
(74) *Attorney, Agent, or Firm* — Harrity & Harrity, LLP

(57) ABSTRACT

In some implementations, a cloud system may obtain data via a copy of an application executing in a first cloud deployment zone of the multiple cloud deployment zones, wherein the application has copies executing in respective cloud deployment zones of the multiple cloud deployment zones. The cloud system may store, in a database executing in the first cloud deployment zone, the data with a deployment zone identifier that indicates the first cloud deployment zone, where the multiple cloud deployment zones include respective databases of multiple databases including the database. The cloud system may perform, via a cloud resource in the first cloud deployment zone, an operation using the data based on the data including the deployment zone identifier that indicates the first cloud deployment zone and based on the cloud resource being in the first cloud deployment zone.

20 Claims, 6 Drawing Sheets

CLOUD RESOURCE OPERATIONS FOR DATABASES IN MULTIPLE DISTRIBUTED CLOUD DEPLOYMENT ZONES

BACKGROUND

"Cloud computing" refers to network-based on-demand availability of computer system resources, such as data storage and computing power. Cloud computing providers typically offer services according to different service models, including Infrastructure as a Service (IaaS), Platform as a Service (PaaS), and Software as a Service (SaaS). In some examples, a cloud computing system may include multiple cloud deployment zones. A cloud deployment zone, sometimes referred to as a cloud deployment region or service region, may serve a given geographic region. The cloud deployment zone may be associated with one or more data centers or servers where cloud computing resources and/or services (e.g., that serve the given geographic region) are hosted. The multiple cloud deployment zones may enable distributed workloads, may improve redundancy in the cloud computing system, may improve reliability in the cloud computing system, and/or may improve performance of the cloud computing system by serving end users from geographically proximate locations, among other examples.

SUMMARY

Some implementations described herein relate to a system for cloud resource operations for databases in multiple cloud deployment zones. The system may include one or more memories and one or more processors communicatively coupled to the one or more memories. The one or more processors may be configured to obtain first data via a copy of an application executing in a first cloud deployment zone of the multiple cloud deployment zones, wherein the application has copies executing in respective cloud deployment zones of the multiple cloud deployment zones. The one or more processors may be configured to write, to a first instance of a database executing in the first cloud deployment zone, the first data with a deployment zone identifier that indicates the first cloud deployment zone, wherein the multiple cloud deployment zones include respective instances of multiple instances of the database including the first instance, and wherein the multiple instances are configured to perform data replication across the multiple instances. The one or more processors may be configured to generate a first event based on writing the first data to the first instance. The one or more processors may be configured to perform, via a cloud resource in the first cloud deployment zone, a learning operation using the first data for a machine learning model based on the first event and based on the first data including the deployment zone identifier that indicates the first cloud deployment zone.

Some implementations described herein relate to a method of cloud resource operations for databases in multiple cloud deployment zones. The method may include obtaining, by a cloud system, data via a copy of an application executing in a first cloud deployment zone of the multiple cloud deployment zones, wherein the application has copies executing in respective cloud deployment zones of the multiple cloud deployment zones. The method may include storing, by the cloud system and in a database executing in the first cloud deployment zone, the data with a deployment zone identifier that indicates the first cloud deployment zone, wherein the multiple cloud deployment zones include respective databases of multiple databases including the database, and wherein the multiple databases are configured to perform multi-deployment zone replication. The method may include performing, by the cloud system and via a cloud resource in the first cloud deployment zone, an operation using the data based on the data including the deployment zone identifier that indicates the first cloud deployment zone and based on the cloud resource being in the first cloud deployment zone.

Some implementations described herein relate to a non-transitory computer-readable medium that stores a set of instructions. The set of instructions, when executed by one or more processors of a system, may cause the system to obtain first data via a copy of an application executing in a first cloud deployment zone of multiple cloud deployment zones, wherein the application has copies executing in respective cloud deployment zones of the multiple cloud deployment zones. The set of instructions, when executed by one or more processors of the system, may cause the system to write, to a database executing in the first cloud deployment zone, the first data with a deployment zone identifier that indicates the first cloud deployment zone, wherein the multiple cloud deployment zones include respective databases of multiple databases including the database, and wherein the multiple databases are configured to perform data replication across the multiple databases. The set of instructions, when executed by one or more processors of the system, may cause the system to generate a first event based on writing the first data to the database. The set of instructions, when executed by one or more processors of the system, may cause the system to perform, via a cloud resource in the first cloud deployment zone, an operation using the first data for a machine learning model based on the first event and based on the first data including the deployment zone identifier that indicates the first cloud deployment zone.

DETAILED DESCRIPTION

Figure 1A:
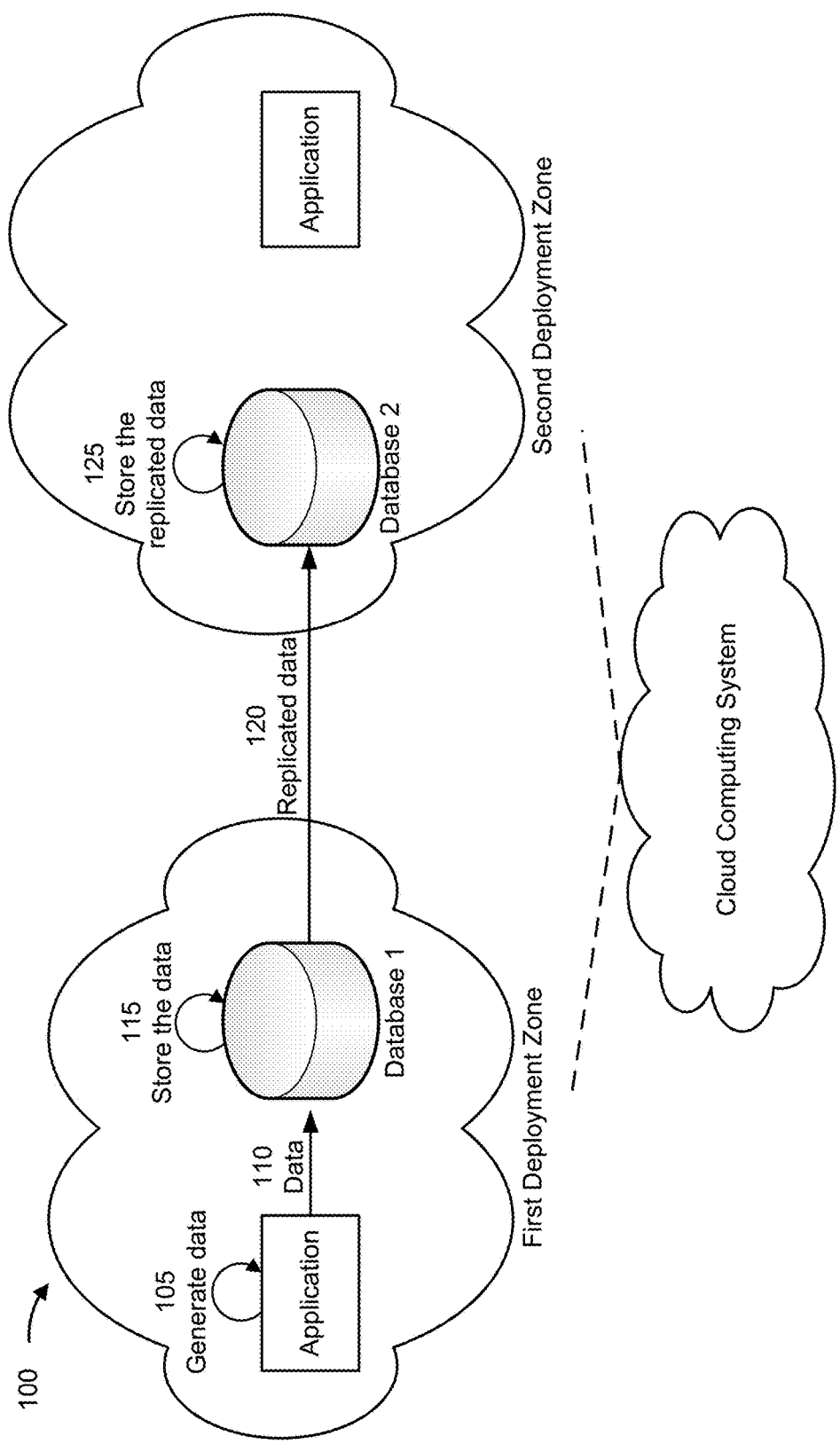
FIGS. 1A-1C are diagrams of an example associated with cloud resource operations for databases in multiple distributed cloud deployment zones, in accordance with some embodiments of the present disclosure.

The following detailed description of example implementations refers to the accompanying drawings. The same reference numbers in different drawings may identify the same or similar elements.

In some examples, a cloud computing system may include multiple cloud deployment zones. The multiple cloud deployment zones may serve respective geographic regions. A cloud deployment zone may be referred to as a region. For example, each cloud deployment zone may be associated with isolated and/or independent cloud computing infrastructure. For example, the multiple cloud deployment zones may be supported by respective data centers or servers (e.g., physically located in the respective geographic regions). The multiple cloud deployment zones may enable an application to be deployed across distributed and/or isolated environments, thereby improving the reliability of the deployed application and/or reducing the impact of a failure of the application in a given cloud deployment zone, among other examples.

For example, multiple copies of the application may be deployed in respective cloud deployment zones of a cloud computing system. Each copy of the application may generate and/or obtain data based on the deployment of that copy of the application. In some examples, each copy of the application may write or store data in a database that is deployed in the same cloud deployment zone as that copy of the application. For example, a first copy of the application (e.g., deployed in a first cloud deployment zone) may write or store data in a first database that is deployed in the first cloud deployment zone and a second copy of the application (e.g., deployed in a second cloud deployment zone) may write or store data in a second database that is deployed in the second cloud deployment zone.

The first database and the second database may be deployments or instances of a distributed database (e.g., the same distributed database). A distributed database may be a database in which data is stored across different physical locations. A distributed database may be stored in multiple devices located in the same physical location (e.g. a data center) or may be dispersed over a network of interconnected devices or nodes (e.g., in the cloud computing system). A cloud database may be a distributed database that executes in a cloud computing environment and enables access to the database via a service. In some examples, a distributed database may include multiple databases deployed in respective cloud deployment zones of the cloud computing system.

In some examples, the multiple databases may be configured to perform data replication across the multiple databases. For example, a cloud database service may support a data replication function. The data replication function may include replicating data that is written or stored in one database in all other databases of the distributed database. For example, the first application (e.g., deployed in the first cloud deployment zone) may write or store data to the first database. The first database may communicate with the second database (e.g., that is deployed in the second cloud deployment zone) to cause the data to also be stored in (e.g., to be replicated in) the second database. This ensures consistency in the data stored in multiple distributed databases (e.g., ensuring that data originating in one cloud deployment zone is also stored in and/or is accessible in a database deployed in a different cloud deployment zone).

In some examples, data being written or stored in a database (e.g., in the cloud computing system) may cause or trigger one or more functions of cloud resources (e.g., components) in the cloud computing system. As an example, data being written or stored in the database may cause an event (e.g., a stream event) to be communicated to another cloud resource of the cloud computing system. The stream event may include an indication of the data written or stored in the database. The cloud resource may perform one or more operations using, or based on, the data written or stored in the database. As an example, the cloud resource may be a serverless function or container that is configured to perform one or more operations based on, or in response to, obtaining the stream event. The database may generate the stream event for any new data and/or any modification of data stored in the database. For example, the database may generate the stream event for new data and/or a modification of data as indicated by another database via a data replication function. For example, the second database may generate a stream event for the data that is indicated by the first database. As a result, a cloud resource deployed in the second cloud deployment zone may perform one or more operations based on, or in response to, obtaining the stream event from the second database. Additionally, when the data is written or stored in the first database, the first database may generate a stream event. A cloud resource deployed in the first cloud deployment zone may also perform one or more operations based on, or in response to, obtaining the stream event from the first database.

As a result, duplicated operation(s) and/or processing may occur for the same data (or the same modification of data) by cloud resources deployed in different cloud deployment zones because of the data replication function. This may consume processing resources, network resources, cloud resources, and/or memory resources, among other examples, associated with the duplicated operation(s) and/or processing for the same data (or the same modification of data). However, eliminating or not performing the data replication function may result in inconsistencies of the data stored in the multiple distributed databases, reducing the reliability and/or integrity of data stored in the multiple distributed databases, and/or negatively impacting the performance of applications or systems that use data stored in the multiple distributed databases, among other examples.

Additionally, in some examples, the one or more operations performed by the cloud resource(s) based on, or in response to, obtaining the stream event may be associated with a training operation or a learning operation of a machine learning model. In such examples, maintaining an order of data and/or modifications of data, and avoiding duplication of data used for the training operation or the learning operation, may improve the performance of the machine learning model. For example, the chronological order of data may provide valuable temporal context, enabling the machine learning model to capture and adapt to evolving patterns and trends in a dataset. Additionally, preventing data duplication ensures that the machine learning model learns from diverse examples, enhancing generalization capabilities. Duplicate instances can skew the learning or training process, leading to overemphasis on specific patterns and/or introducing bias, thereby reducing the performance of the machine learning model. In examples where the one or more operations performed by the cloud resource(s) based on, or in response to, obtaining the stream event may be associated with a training operation or a learning operation of a machine learning model, different cloud resources (e.g., deployed in different cloud deployment zones) may provide the same data to the machine learning model for training and/or online learning. As a result, the same data (or the same modification to data) may be used in a training operation or a learning operation for the machine learning model multiple times. The use of the same data (or the same modification to data) multiple times may introduce bias, reduce a generalization capability of the machine learning model, reduce an ability of the machine learning model to capture and adapt to evolving patterns and trends, and/or may consume resources (e.g., processing resources, computing resources, and/or memory resources) associated with performing the training operation or learning operations multiple times using the same data (or the same modification to data), among other examples.

Some implementations described herein enable enhanced cloud resource operations for databases in multiple distributed cloud deployment zones. In some implementations, a cloud computing system may cause (e.g., trigger) a cloud resource to perform an operation using data stored or modified in a database only if the storage or modification of the data originated in the same cloud deployment zone in which the cloud resource is deployed. As used herein, a cloud deployment zone in which data was "originated" may be the cloud deployment zone in which an application (or other component) that provides the data (or a modification of the data) is deployed. For example, the cloud deployment zone in which data was originated may be the source cloud deployment zone of the data.

In some implementations, data may be written or stored in a database (e.g., an instance or deployment of a distributed database) with a deployment zone identifier that identifies in which cloud deployment zone the data was originated. For example, when data is replicated as part of a data replication operation (e.g., across multiple databases of the distributed database), the data may be written or stored with the deployment zone identifier. The cloud computing system may use the deployment zone identifier to filter out (or remove) data that was not originated in a given cloud deployment zone when providing data to a cloud resource (e.g., a serverless function or another cloud resource) in the given cloud deployment zone.

In some implementations, the cloud computing system may obtain first data via a copy of an application executing in a first cloud deployment zone of the multiple cloud deployment zones. The cloud computing system may write, to a database executing in the first cloud deployment zone, the first data with a deployment zone identifier that indicates the first cloud deployment zone. In some implementations, the cloud computing system may generate a first event based on writing the first data to the database. The cloud computing system may perform, via a cloud resource in the first cloud deployment zone, an operation (e.g., a learning operation for a machine learning model) using the first data based on the first event and based on the first data including the deployment zone identifier that indicates the first cloud deployment zone. In other words, the cloud computing system may cause the cloud resource to perform the operation based on the data originating from the same cloud deployment zone in which the cloud resource is deployed. As another example, if the deployment zone identifier were to indicate a second cloud deployment zone, then the cloud computing system (and/or the cloud resource) may refrain from performing the operation.

As a result, the techniques and implementations described herein may conserve processing resources, network resources, cloud resources, and/or memory resources, that would have otherwise been used in association with performing an operation (e.g., via a cloud resource, such as a serverless function) multiple times for the same data (and/or the same modification of data). For example, by storing data in an instance of a distributed database with a deployment zone identifier, the cloud computing system may be enabled to differentiate between replicated data and data that is originated in a given cloud deployment zone. This may enable the cloud computing system to filter out or remove data that is replicated in a given cloud deployment zone and perform other operations (e.g., via a cloud resource, such as a serverless function) using only data that is originated in or sourced in the cloud deployment zone in which the cloud resource is deployed. This reduces the likelihood of duplicate processing in different cloud deployment zones for the same data (or the same modification of data).

Additionally, where the operation performed via the cloud resource is associated with a training operation or a learning operation (e.g., an online learning operation) of a machine learning model, the techniques and implementations described herein may improve the performance of the training operation or the learning operation. For example, by performing the operation (e.g., via a cloud resource, such as a serverless function) using only data that is originated in or sourced in the cloud deployment zone in which the cloud resource is deployed, the cloud computing system may reduce a likelihood that an indication of the same data (or the same modification of data) is provided to a machine learning model (e.g., for the training operation or the learning operation) multiple times. This improves the likelihood that an order of data and/or modification of data is maintained, thereby improving the ability of the machine learning model to capture and/or identify temporal trends in a dataset. Additionally, by performing the operation (e.g., via a cloud resource, such as a serverless function) using only data that is originated in or sourced in the cloud deployment zone in which the cloud resource is deployed, the cloud computing system may reduce a likelihood that bias is introduced to the machine learning model, improve a generalization capability of the machine learning model, improve an ability of the machine learning model to capture and adapt to evolving patterns and trends, and/or conserve resources (e.g., processing resources, computing resources, and/or memory resources) that would have otherwise been used in association with performing training operations or learning operations multiple times using the same data (or the same modification to data), among other examples.

Figure 1B:
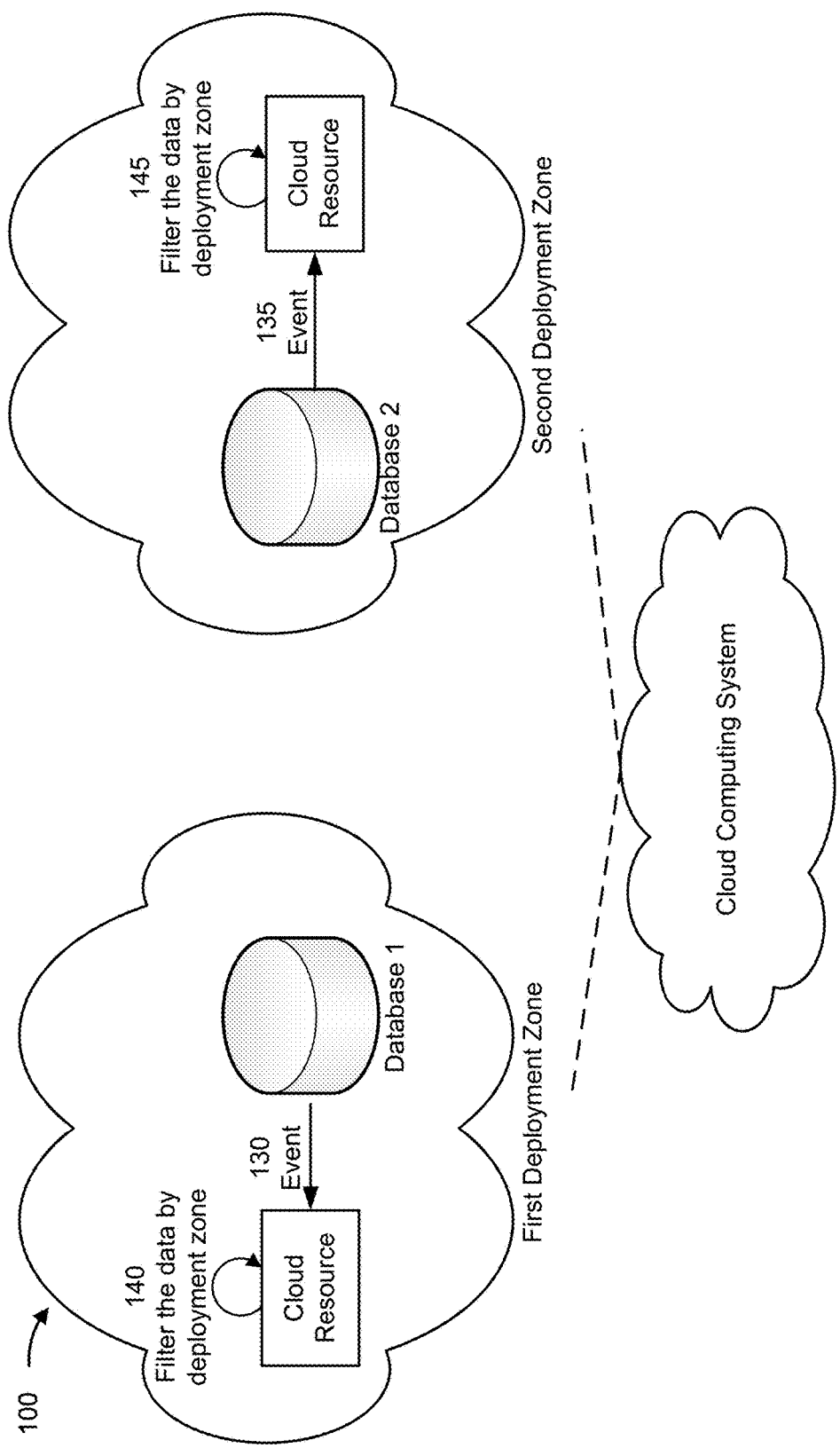
Figure 1C:
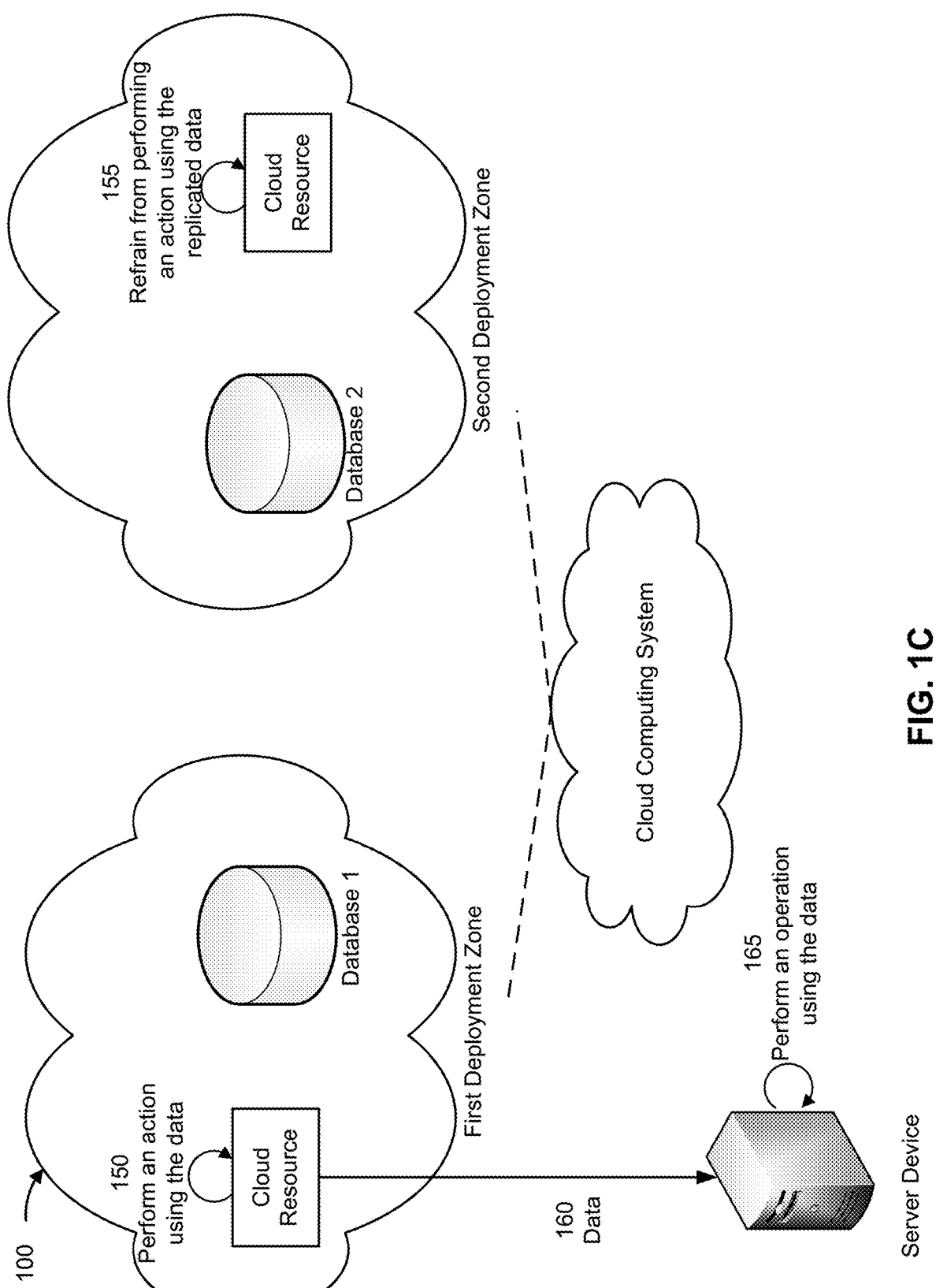

FIGS. 1A-1C are diagrams of an example 100 associated with cloud resource operations for databases in multiple distributed cloud deployment zones. As shown in FIGS. 1A-1C, example 100 includes a cloud computing system that includes multiple cloud deployment zones (shown as a first deployment zone and a second deployment zone, as an example) and a machine learning (ML) model management device. Each cloud deployment zone of the cloud computing system may include an application, a database (e.g., an instance or deployment of a distributed database), and/or a cloud resource deployed in the cloud deployment zone. These devices are described in more detail in connection with FIGS. 2 and 3.

As shown in FIG. 1A, the cloud computing system may include multiple cloud deployment zones (e.g., regions). In a first deployment zone (e.g., a first cloud deployment zone), an application and a database (e.g., a first database, shown as database 1) may be deployed. In a second deployment zone (e.g., a second cloud deployment zone), an application and a database (e.g., a second database, shown as database 2) may be deployed. Although examples described herein are described using two cloud deployment zones, the techniques and implementations described herein may be similarly applied to any number of cloud deployment zones. Additionally, the techniques and implementations described herein may be applied to multiple availability zones within a single cloud deployment zone. For example, a given cloud deployment zone may include multiple availability zones having respective applications and/or respective instances of a distributed database deployed therein. The techniques and implementations described herein may be applied within a single cloud deployment zone (e.g., across multiple availability zones), in a similar manner as described herein.

The applications deployed in the first deployment zone and the second deployment zone may be copies of the same application. For example, a first copy of the application may be deployed in the first deployment zone and a second copy of the application may be deployed in the second deployment zone. In other words, the applications may be copies executing in respective cloud deployment zones of the multiple cloud deployment zone associated with the cloud computing system.

The first database and the second database may be instances or deployments of a distributed database. For example, multiple instances of the distributed database (shown as database 1 and database 2 in FIG. 1A) may be deployed in respective cloud deployment zones of the cloud computing system. The deployment of multiple instances in different cloud deployment zones may improve fault tolerance and improve the availability of the distributed database. Additionally, the distribution across cloud deployment zones allows the instances of the distributed database to be deployed closer (e.g., geographically) to end users, reducing latency and enhancing overall performance.

In some implementations, the distributed database may support a data replication function. For example, the distributed database may support the data replication function to synchronize information across distributed instances of the distributed database, ensuring consistency and durability of data stored in the distributed database. For example, the distributed database may utilize a synchronous replication approach across multiple availability zones within a cloud deployment zone, as well as asynchronous replication across different cloud deployment zones. Within a cloud deployment zone, the distributed database may maintain multiple copies of data across distinct availability zones. An availability zone may include physically separate data centers with independent power and networking infrastructure. The synchronous replication ensures that updates are propagated to all copies of the data before acknowledging a write operation, enhancing data durability and fault tolerance against zone-specific failures. Additionally, the distributed database may support cross-zone replication, asynchronously propagating changes to copies deployed in different cloud deployment zones. The asynchronous replication enables the distributed database to provide a database service across a wide geographic area with low-latency access to data in various cloud deployment zones.

For example, as shown by reference number 105, a first copy of an application (e.g., deployed in the first deployment zone) may generate data. The data may be any data to be stored, modified, and/or removed in the distributed database. For example, the application (e.g., a copy of the application deployed or executing in the first deployment zone) may perform an operation associated with adding, modifying, and/or removing the data from the distributed database. The application (e.g., a copy of the application deployed or executing in the first deployment zone) may update the instance (e.g., database 1) of the distributed database that is deployed in the first deployment zone.

As shown by reference number 110, the application may provide an indication of the data (e.g., an indication of an update to the distributed database) to the instance of the distributed database deployed in the first deployment zone. For example, the application may provide an update expression to the instance (e.g., the database 1) of the distributed database. The update expression may use keywords (such as set, remove, or add) that indicate or define the modification(s) to be performed. For example, the keyword(s) may indicate that data is to be updated, added, deleted, and/or incremented (e.g., for numeric values), among other examples. An update expression may indicate a key value of data (e.g., of an item and/or attribute) to be updated.

As shown by reference number 115, the instance of the distributed database may store the data. For example, the instance of the distributed database may perform an operation to update the distributed database as instructed by the application (e.g., by the update expression provided by the application). For example, the instance of the distributed database may add data to the distributed database, may remove data from the distributed database, and/or modify a value of data already stored in the distributed database, among other examples. For example, the cloud computing system (e.g., via the database 1) may store (or write) data in the instance of the distributed database with a deployment zone identifier that indicates the first deployment zone.

For example, the deployment zone identifier may identify a cloud deployment zone, of the multiple cloud deployment zones associated with the cloud computing system, in which data is originated. In some implementations, the deployment zone identifier may indicate a cloud deployment zone in which an update expression that caused the data to be updated (e.g., added, removed, or modified) was provided to the distributed database. As another example, the deployment zone identifier may indicate a cloud deployment zone in which an instance that initially performed the update to the data was deployed or executing. In other words, the deployment zone identifier may indicate a source cloud deployment zone (e.g., a source region) of the data and/or the update to the data.

Additionally, or alternatively, the data (or the update to the data) may be stored or written with an availability zone identifier. The availability zone identifier may indicate an availability zone (e.g., of multiple availability zones included in the first deployment zone) in which the data (or the update to the data) originated. For example, the availability zone identifier may indicate an availability zone in which the application and/or the database 1 are deployed or are executing within the first deployment zone.

As shown in FIG. 1A, the distributed database may perform a data replication operation. The multiple databases (e.g., multiple instances) of the distributed database may be configured to perform data replication across the multiple databases (e.g., across the multiple instances). For example, as shown by reference number 120, the first database (e.g., a first instance of the distributed database) may provide, and the second database (e.g., database 2) may obtain, an indication of replicated data. The replicated data may indicate an update to data that was performed via the first database and that is to be replicated in the second database (e.g., in a second instance of the distributed database). For example, each instance of the distributed database may be communicatively connected with one or more other instances to enable data replication across instances of the distributed database. As an example, when there is an update to a first instance (e.g., the database 1), the distributed database may generate a stream event that indicates the update to one or more other instances (e.g., the database 2) of the distributed database.

As shown by reference number 125, the second instance (e.g., the database 2) of the distributed database (e.g., deployed or executing in the second deployment zone) may store or write the replicated data. For example, the second instance of the distributed database may perform the same update as was performed via the first instance (e.g., the database 1), such as described in connection with reference number 115. For example, the second instance of the distributed database may store the same data that was stored in the first instance (e.g., the database 1) as described in connection with reference number 115.

The second instance of the distributed database may store the data with the deployment zone identifier that indicates the first deployment zone. For example, when storing replicated data in given instance of the distributed database, the cloud computing system may cause the data to be stored with an indication (e.g., the deployment zone identifier) of the source or originating deployment zone for the data. This may enable the cloud computing system (e.g., cloud resources or components of the cloud computing system) to differentiate between replicated data and data that originated in a given deployment zone. Additionally, or alternatively, when storing replicated data in a given instance of the distributed database, the cloud computing system may cause the data to be stored (e.g., in the instance of the database deployed in the second deployment zone) with an indication of an availability zone within the first deployment zone in which the data was originated (e.g., in which the copy of the application and/or the instance of the distributed database are executing in the first deployment zone).

As shown in FIG. 1B, the cloud computing system (e.g., via the distributed database) may generate events based on updating instances of the distributed database. For example, as shown by reference number 130, the cloud computing system may generate a first event based on writing the data to the first instance (e.g., the database 1) of the distributed database. The first event may be generated in the first deployment zone. As shown by reference number 135, the cloud computing system may generate a second event based on writing the (replicated) data to the second instance (e.g., the database 2) of the distributed database. The second event may be generated in the second deployment zone. For example, the cloud computing system may generate events for respective cloud deployment zones in which instances of the distributed database are deployed or executing (e.g., where the instances of the distributed database were updated as part of the original update or as part of the data replication function).

The events (e.g., the first event and the second event) may be stream events. "Stream events" may refer to a mechanism that enables real-time tracking and processing of changes to data within a database. For example, "stream" may refer to a chronological sequence of events capturing modifications to a distributed database. The events (e.g., stream events) may be additions, modification, and/or deletions of data. For example, when a streaming function is enabled for the distributed database, any changes made to the data in the distributed database may cause a corresponding event to be recorded in a stream (e.g., in a deployment zone in which an instance of the distributed database is deployed or is executing). The stream events may be made available for consumption by one or more cloud resources, enabling the cloud resources to react to changes in the distributed database in near real-time.

For example, a cloud resource in a given cloud deployment zone may filter stream events using the deployment zone identifier. For example, as shown by reference number 140, a first cloud resource in the first deployment zone may filter the data indicated by the event (e.g., the stream event) by deployment zone. As an example, the first cloud resource may filter the event and/or the data to remove any data that did not originate in the first deployment zone. For example, the first cloud resource may filter the data indicated by the event using a deployment zone identifier. The first cloud resource may search for and/or identify data that includes an indication that the data originated in the first deployment zone. The first cloud resource may search for and/or identify data that includes an indication that the data originated in a cloud deployment zone other than the first deployment zone. The data that originated in a cloud deployment zone other than the first deployment zone may be replicated data in the first deployment zone. The first cloud resource may remove the replicated data from data to be processed by the first cloud resource and/or by another cloud resource.

In some implementations, the first cloud resource may filter the event and/or the data to remove any data that did not originate in an availability zone in which the first cloud resource is deployed and/or is executing. For example, the first cloud resource may search for and/or identify any data that originated in an availability zone other than the availability zone in which the first cloud resource is deployed and/or is executing. The first cloud resource may remove such data from a dataset to be processed by the first cloud resource and/or by another cloud resource.

In a similar manner, and as shown by reference number 145, a second cloud resource (e.g., deployed and/or executing in the second deployment zone) may filter the data indicated by the event (e.g., the stream event) by deployment zone. As an example, the second cloud resource may filter the event and/or the data to remove any data that did not originate in the second deployment zone. For example, the second cloud resource may filter the data indicated by the event using a deployment zone identifier. The second cloud resource may search for and/or identify data that includes an indication that the data originated in the second deployment zone. The second cloud resource may search for and/or identify data that includes an indication that the data originated in a cloud deployment zone other than the second deployment zone. The data that originated in a cloud deployment zone other than the second deployment zone may be replicated data in the second deployment zone. The second cloud resource may remove the replicated data from data to be processed by the second cloud resource and/or by another cloud resource. For example, the second cloud resource may remove the data stored in the database 2 (e.g., as described in connection with reference number 125) from a dataset to be processed by the second cloud resource and/or by another cloud resource in the second deployment zone.

In some implementations, the second cloud resource may filter the event and/or the data to remove any data that did not originate in an availability zone in which the second cloud resource is deployed and/or is executing. For example, the second cloud resource may search for and/or identify any data that originated in an availability zone other than the availability zone in which the second cloud resource is deployed and/or is executing. The second cloud resource may remove such data from a dataset to be processed by the second cloud resource and/or by another cloud resource in the second deployment zone.

As shown in FIG. 1C, and by reference number 150, the first cloud resource (e.g., deployed or executing in the first deployment zone) may perform an action using the data (e.g., that was generated and/or stored as described in connection with FIG. 1A). For example, based on, or in response to, the data including an indication that the data originated in the first deployment zone, the first cloud resource may perform the action. In other words, the first cloud resource may perform the action because the data originated in the same cloud deployment zone in which the first cloud resource is deployed (e.g., the first deployment zone). Additionally, or alternatively, the first cloud resource may perform the action based on, or in response to, the data including an indication that the data originated in an availability zone (e.g., included in the first deployment zone) in which the first cloud resource is deployed and/or is executing. In some implementations, the first cloud resource may be a serverless function, a container, or another component configured to perform the operation using updates to the distributed database.

The first cloud resource may refrain from performing the action for data that originated in a cloud deployment zone other than the first deployment zone. For example, a second event associated with the first instance (e.g., the database 1) of the distributed database may indicate an update for data where the update originated in the second deployment zone. The first cloud resource may refrain from performing the action based on, or in response to, the update originating in the second deployment zone. For example, the update originating in the second deployment zone may be filtered out from a dataset provided to the first cloud resource.

For example, the cloud computing system may trigger, based on generating the first event, the first cloud resource to be activated. The cloud computing system may remove, via the first cloud resource, any data from a set of data (e.g., indicated by the first event) that includes a deployment zone identifier that indicates a second cloud deployment zone based on the first cloud resource being included in the first deployment zone. The cloud computing system (e.g., via the first cloud resource) may filter, via the first cloud resource, replicated data from the data set (e.g., indicated by the first event) using the deployment zone identifier that indicates the first cloud deployment zone to filter out any data not originating from the first deployment zone.

As shown by reference number 155, the second cloud resource (e.g., deployed or executing in the second deployment zone) may refrain from performing an action using the replicated data. For example, the second cloud resource may refrain from performing the action using the update and/or the data (e.g., the update and/or the data for which the action is performed by the first cloud resource as described in connection with reference number 150) based on, or in response to, the update and/or the data indicating (e.g., via the deployment zone identifier) that the update and/or the data originated in the first deployment zone (e.g., and based on the second cloud resource being deployed in the second deployment zone). In other words, a cloud resource (e.g., a serverless function) may refrain from performing an action for any updates or data associated with the distributed database that did not originate in the cloud deployment zone and/or the availability zone in which the cloud resource is deployed. The cloud resource(s) may use the deployment zone identifier to identify in which cloud deployment zone and/or in which availability zone a given update and/or given data originated.

In some implementations, the action (e.g., performed by the first cloud resource and not performed by the second cloud resource) may include a processing operation. In some implementations, the action may include triggering a serverless function or another component of the cloud computing system. In some implementations, the action may include communicating (e.g., transmitting) an indication of the update and/or the data to another device, such as the server device. For example, as shown by reference number 160, the first cloud resource may transmit, and the server device may receive, an indication of the data (and/or of the update made to the distributed database).

In some implementations, the action may be associated with a training operation or a learning operation for a machine learning model. For example, the server device may be configured to perform the training operation or the learning operation using updates (e.g., data updated in the distributed database). The training operation or the learning operation may be an online learning operation. For example, the training operation or the learning operation may include a stochastic gradient descent operation that uses the data (e.g., updated in the distributed database) to train the machine learning model.

As shown by reference number 165, the server device may perform an operation using the data and/or the update indicated by the first cloud resource. For example, the server device may perform the training operation or the learning operation for the machine learning model using the data and/or using the update to the distributed database. The server device may train the machine learning model using the data and/or using the update to the distributed database. As described elsewhere herein, maintaining an order or temporal information for the data used for the training operation or the learning operation may improve the performance of the machine learning model. By ensuring that replicated data is not provided to the server device for the training operation or the learning operation, the cloud computing system may reduce a likelihood that the same data and/or the same update is used as part of multiple learning operations for the machine learning model. This improves the training operation or the learning operation, improves an ability of the machine learning model to recognize temporal trends, reduces a likelihood of the introduction of bias to the machine learning model, and/or conserves resources (e.g., processing resources, network resources, and/or memory resources) that would have otherwise been associated with performing the operation using the same data and/or the same update that is used as part of multiple learning operations for the machine learning model.

As indicated above, FIGS. 1A-1C are provided as an example. Other examples may differ from what is described with regard to FIGS. 1A-1C.

Figure 2:
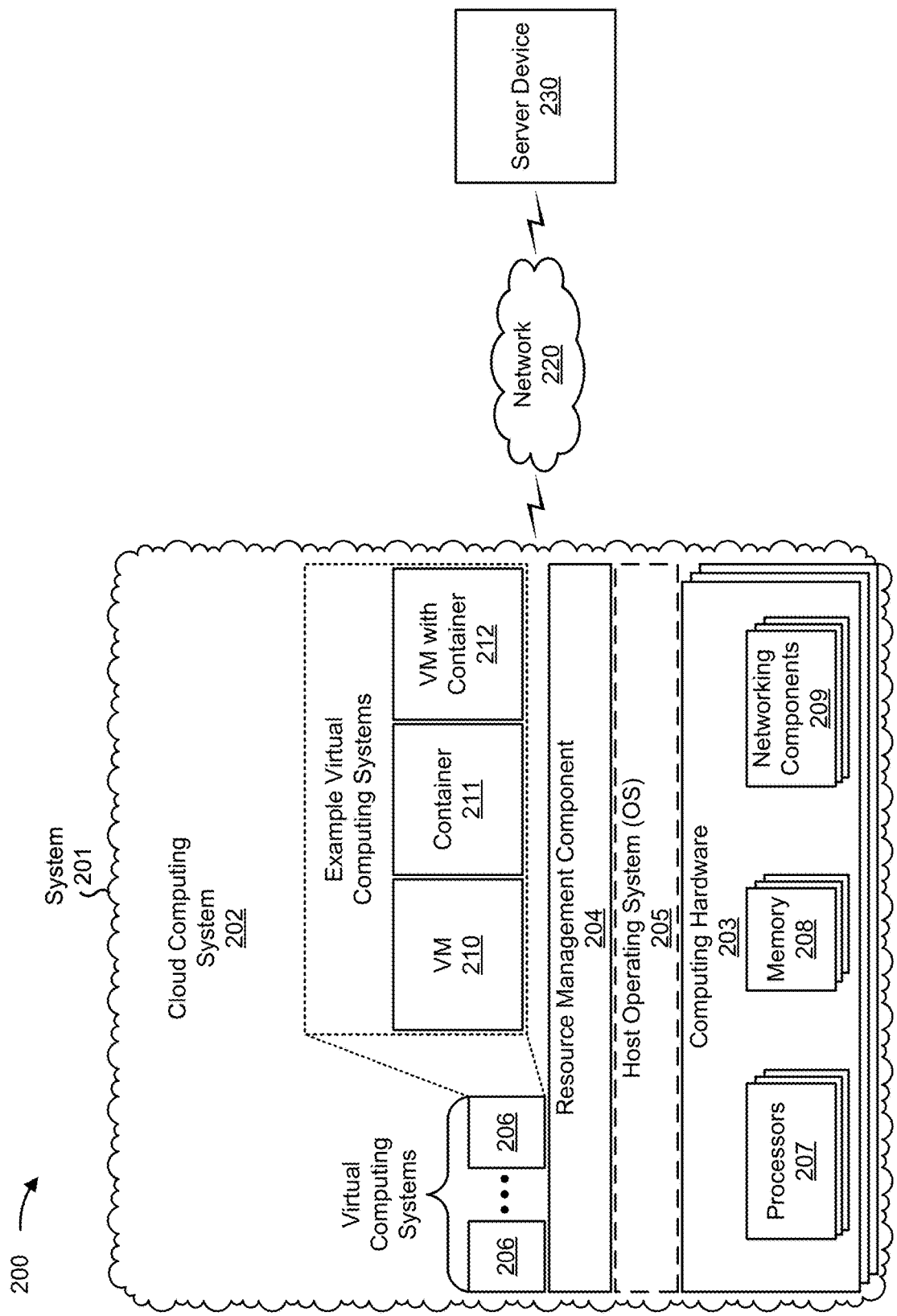
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a system 201, which may include one or more elements of and/or may execute within a cloud computing system 202. The cloud computing system 202 may include one or more elements 203-212, as described in more detail below. As further shown in FIG. 2, environment 200 may include a network 220, and/or a server device 230, among other examples. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. A virtual computing system 206 may be referred to as a "cloud resource" herein. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. In some implementations, a virtual computing system 206 may include a serverless function (sometimes referred to as an anonymous function or a Lambda function). A virtual computing system 206 may execute one or more applications using a file system that includes binary files, software libraries, and/or other resources required to execute applications on a guest operating system (e.g., within the virtual computing system 206) or the host operating system 205.

Although the system 201 may include one or more elements 203-212 of the cloud computing system 202, may execute within the cloud computing system 202, and/or may be hosted within the cloud computing system 202, in some implementations, the system 201 may not be cloud-based (e.g., may be implemented outside of a cloud computing system) or may be partially cloud-based. For example, the system 201 may include one or more devices that are not part of the cloud computing system 202, such as device 300 of FIG. 3, which may include a standalone server or another type of computing device. The system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The server device 230 may include one or more devices capable of receiving, generating, storing, processing, providing, and/or routing information associated with cloud resource operations for databases in multiple distributed cloud deployment zones, as described elsewhere herein. For example, the server device 230 may be configured to perform an operation (e.g., a training operation or a learning operation for a machine learning model or another operation) using data obtained from the cloud computing system 202, such as via a virtual computing system 206, as described in more detail elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment, such as the cloud computing system 202.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
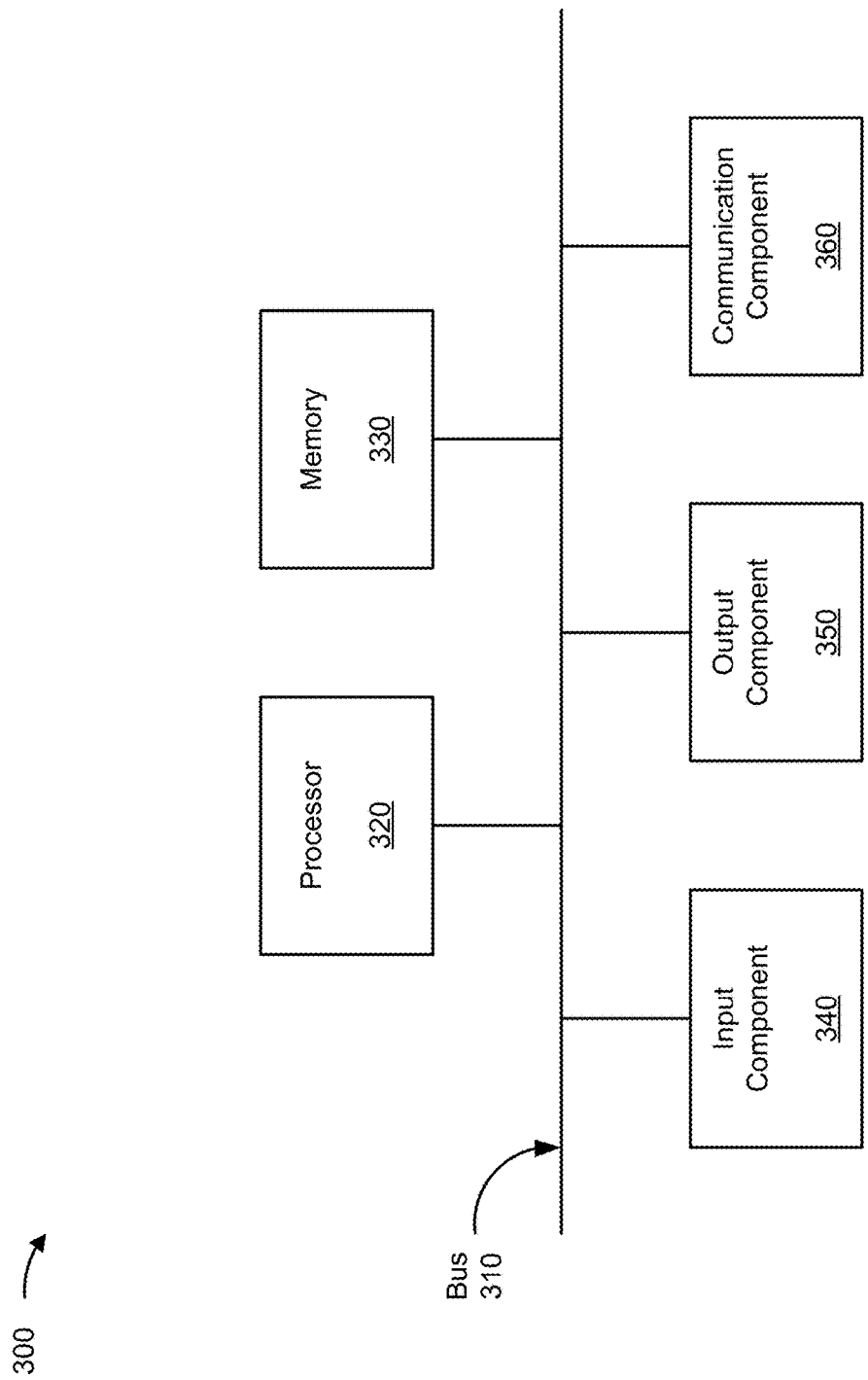
FIG. 3 is a diagram of example components of a device associated with cloud resource operations for databases in multiple distributed cloud deployment zones, in accordance with some embodiments of the present disclosure.

FIG. 3 is a diagram of example components of a device 300 associated with cloud resource operations for databases in multiple distributed cloud deployment zones. The device 300 may correspond to the cloud computing system 202, a component in the cloud computing system 202, and/or the server device 230. In some implementations, the cloud computing system 202, a component in the cloud computing system 202, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
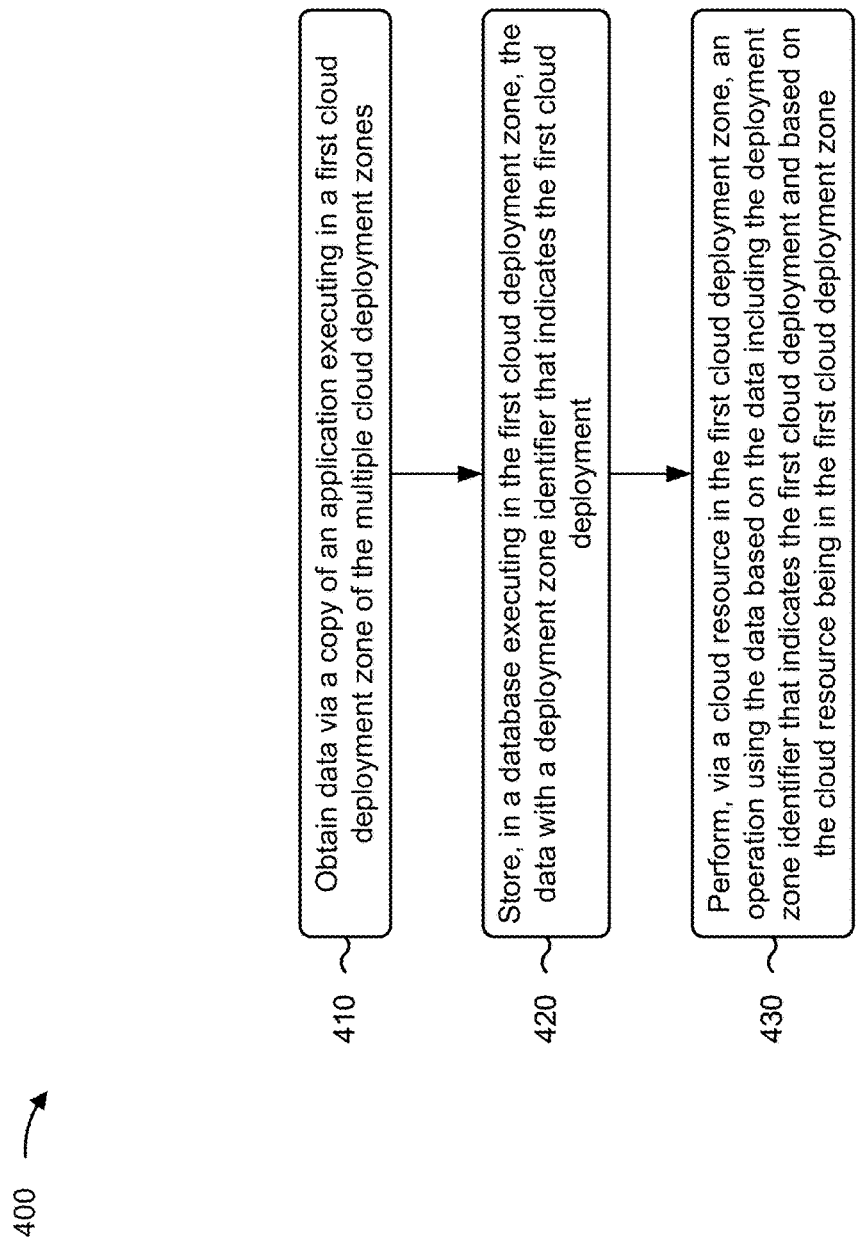
FIG. 4 is a flowchart of an example process associated with cloud resource operations for databases in multiple distributed cloud deployment zones, in accordance with some embodiments of the present disclosure.

FIG. 4 is a flowchart of an example process 400 associated with cloud resource operations for databases in multiple distributed cloud deployment zones. In some implementations, one or more process blocks of FIG. 4 may be performed by the cloud computing system 202. In some implementations, one or more process blocks of FIG. 4 may be performed by another device or a group of devices separate from or including the cloud computing system 202, such as the server device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining data via a copy of an application executing in a first cloud deployment zone of the multiple cloud deployment zones, (block 410). For example, the cloud computing system 202 (e.g., using processor 320 and/or memory 330) may obtain data via a copy of an application executing in a first cloud deployment zone of the multiple cloud deployment zones, as described above in connection with reference number 110 of FIG. 1A. In some implementations, the application has copies executing in respective cloud deployment zones of the multiple cloud deployment zones. As an example, the application may provide an indication of an update to be made to a distributed database. For example, the application may provide an indication of the update to the data to an instance of a distributed database deployed in the first cloud deployment zone.

As further shown in FIG. 4, process 400 may include storing, in a database executing in the first cloud deployment zone, the data with a deployment zone identifier that indicates the first cloud deployment zone (block 420). For example, the cloud computing system 202 (e.g., using processor 320 and/or memory 330) may store, in a database executing in the first cloud deployment zone, the data with a deployment zone identifier that indicates the first cloud deployment zone, as described above in connection with reference number 115 of FIG. 1A. In some implementations, the multiple cloud deployment zones include respective databases of multiple databases including the database. In some implementations, the multiple databases are configured to perform multi-deployment-zone replication. As an example, the multiple databases may be multiple instances (e.g., of the same distributed database) deployed in respective cloud deployment zones. The cloud computing system 202 may cause the update indicated by the application to be applied to an instance of the distributed database deployed in the first cloud deployment zone (e.g., by storing the data indicated by the update in the instance of the distributed database deployed in the first cloud deployment zone).

As further shown in FIG. 4, process 400 may include performing, via a cloud resource in the first cloud deployment zone, an operation using the data, based on the data including the deployment zone identifier that indicates the first cloud deployment zone and based on the cloud resource being in the first cloud deployment zone (block 430). For example, the cloud computing system 202 (e.g., using processor 320 and/or memory 330) may perform, via a cloud resource in the first cloud deployment zone, an operation using the data, based on the data including the deployment zone identifier that indicates the first cloud deployment zone and based on the cloud resource being in the first cloud deployment zone, as described above in connection with reference number 150 of FIG. 1C. As an example, the cloud computing system 202 may cause the cloud resource to perform a processing operation using the data (e.g., based on the data originating in the cloud deployment zone in which the cloud resource is deployed). In other words, the cloud computing system 202 may cause the cloud resource to perform the operation only for data that originates in the cloud deployment zone in which the cloud resource is deployed (e.g., by filtering data provided by the distributed database using a deployment zone identifier). In some implementations, the operation may include transmitting the data and/or an indication of the update to the distributed database to a device, such as the server device 230. In some implementations, the operation may be associated with a training operation or a learning operation for a machine learning model, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for cloud resource operations for databases in multiple cloud deployment zones, the system comprising:
   one or more memories; and
   one or more processors, communicatively coupled to the one or more memories, configured to:
      obtain first data via a copy of an application executing in a first cloud deployment zone of the multiple cloud deployment zones,
         wherein the application has copies executing in respective cloud deployment zones of the multiple cloud deployment zones;
      write, to a first instance of a database executing in the first cloud deployment zone, the first data with a deployment zone identifier that indicates the first cloud deployment zone,
         wherein the multiple cloud deployment zones include respective instances of multiple instances of the database including the first instance, and
         wherein the multiple instances are configured to perform data replication across the multiple instances;
      generate a first event based on writing the first data to the first instance; and perform, via a cloud resource in the first cloud deployment zone, a learning operation using the first data for a machine learning model based on the first event and based on the first data including the deployment zone identifier that indicates the first cloud deployment zone.

2. The system of claim 1, wherein the one or more processors are further configured to:
obtain an indication of a second event associated with second data that includes a deployment zone identifier that indicates a second cloud deployment zone; and
refrain from performing, via the cloud resource, the learning operation using the second data based on the second data including the deployment zone identifier that indicates the second cloud deployment zone and based on the cloud resource being in the first cloud deployment zone.

3. The system of claim 1, wherein the one or more processors, to perform the learning operation, are configured to:
provide, via the cloud resource, the first data to the machine learning model to cause the learning operation to be performed.

4. The system of claim 1, wherein the one or more processors are further configured to:
filter, via the cloud resource, data obtained via updates to the first instance using the deployment zone identifier that indicates the first cloud deployment zone to filter out any data not originating from the first cloud deployment zone.

5. The system of claim 1, wherein the first event is associated with a set of data including the first data, and wherein the one or more processors are further configured to:
trigger, based on generating the first event, the cloud resource to perform an operation; and
remove, via the cloud resource, second data from the set of data that includes a deployment zone identifier that indicates a second cloud deployment zone based on the cloud resource being included in the first cloud deployment zone.

6. The system of claim 1, wherein the deployment zone identifier identifies a cloud deployment zone, of the multiple cloud deployment zones, in which data is originated.

7. The system of claim 1, wherein the learning operation includes a stochastic gradient descent operation that uses the data to train the machine learning model.

8. The system of claim 1, wherein the cloud resource includes a serverless function that is triggered by the first event.

9. A method of cloud resource operations for databases in multiple cloud deployment zones, comprising:
obtaining, by a cloud system, data via a copy of an application executing in a first cloud deployment zone of the multiple cloud deployment zones,
wherein the application has copies executing in respective cloud deployment zones of the multiple cloud deployment zones;
storing, by the cloud system and in a database executing in the first cloud deployment zone, the data with a deployment zone identifier that indicates the first cloud deployment zone,
wherein the multiple cloud deployment zones include respective databases of multiple databases including the database, and
wherein the multiple databases are configured to perform multi-deployment zone replication; and
performing, by the cloud system and via a cloud resource in the first cloud deployment zone, an operation using the data based on the data including the deployment zone identifier that indicates the first cloud deployment zone and based on the cloud resource being in the first cloud deployment zone.

10. The method of claim 9, wherein performing the operation comprises:
transmitting, via the cloud resource, the data to a device.

11. The method of claim 9, wherein performing the operation comprises:
providing, via the cloud resource, the data to a machine learning model to cause the machine learning model to be trained using the data.

12. The method of claim 9, wherein the multi-deployment zone replication includes storing replicated data in the database that includes a deployment zone identifier that indicates a second cloud deployment zone, and wherein performing the operation comprises:
refraining from performing the operation using the replicated data based on the replicated data including the deployment zone identifier that indicates the second cloud deployment zone.

13. The method of claim 9, further comprising:
removing, via the cloud resource, replicated data from the data used for the operation,
wherein the replicated data is associated with the multi-deployment zone replication, and
wherein the replicated data originates from a second cloud deployment zone.

14. The method of claim 9, wherein storing the data in the database causes an event to be generated, the method further comprising:
triggering, based on the event, the cloud resource to perform the operation; and
removing replicated data from the of data that includes a deployment zone identifier that indicates a second cloud deployment zone based on the cloud resource being included in the first cloud deployment zone.

15. The method of claim 9, wherein the deployment zone identifier identifies a cloud deployment zone, of the multiple cloud deployment zones, in which data is originated.

16. A non-transitory computer-readable medium storing a set of instructions, the set of instructions comprising:
one or more instructions that, when executed by one or more processors of a system, cause the system to:
obtain first data via a copy of an application executing in a first cloud deployment zone of multiple cloud deployment zones,
wherein the application has copies executing in respective cloud deployment zones of the multiple cloud deployment zones;
write, to a database executing in the first cloud deployment zone, the first data with a deployment zone identifier that indicates the first cloud deployment zone,
wherein the multiple cloud deployment zones include respective databases of multiple databases including the database, and
wherein the multiple databases are configured to perform data replication across the multiple databases;
generate a first event based on writing the first data to the database; and
perform, via a cloud resource in the first cloud deployment zone, an operation using the first data for a machine learning model based on the first event and based on the first data including the deployment zone identifier that indicates the first cloud deployment zone.

17. The non-transitory computer-readable medium of claim 16, wherein the one or more instructions further cause the system to:
obtain an indication of a second event associated with second data that includes a deployment zone identifier that indicates a second cloud deployment zone; and
refrain from performing, via the cloud resource, the operation using the second data based on the second data including the deployment zone identifier that indicates the second cloud deployment zone and based on the cloud resource being in the first cloud deployment zone.

18. The non-transitory computer-readable medium of claim 16, wherein the one or more instructions, that cause the system to perform the operation, cause the system to:
provide, via the cloud resource, the first data to the machine learning model to cause a learning operation to be performed.

19. The non-transitory computer-readable medium of claim 16, wherein the one or more instructions further cause the system to:
filter, via the cloud resource, replicated data from the data using the deployment zone identifier that indicates the first cloud deployment zone to filter out any data not originating from the first cloud deployment zone.

20. The non-transitory computer-readable medium of claim 16, wherein the first event is associated with a set of data including the first data, and wherein the one or more processors are further configured to:
trigger, based on generating the first event, the cloud resource to be activated; and
remove, via the cloud resource, second data from the set of data that includes a deployment zone identifier that indicates a second cloud deployment zone based on the cloud resource being included in the first cloud deployment zone.

* * * * *